United States Patent [19]

Lu et al.

[11] Patent Number: 4,963,011
[45] Date of Patent: Oct. 16, 1990

[54] RAINDROP AND DUST FREE VISION FOR OUTSIDE REAR VIEW CAR MIRRORS

[76] Inventors: Chih-Hsiung Lu, 4th Fl., No. 5, Lane 306, Kung Kuan Road, Peitou, Taipei, Taiwan; Jill H. Lu, 907 Manley Dr., San Gabriel, Calif. 91776

[21] Appl. No.: 353,477
[22] Filed: May 18, 1989
[51] Int. Cl.$^5$ ............................ G02B 5/08; B60R 1/06
[52] U.S. Cl. .................................... 350/584; 350/582
[58] Field of Search .................. 350/582, 584; 296/91, 296/154, 180.1

[56] References Cited

U.S. PATENT DOCUMENTS

| | | | |
|---|---|---|---|
| 3,859,899 | 1/1975 | Mills | 350/584 |
| 4,449,796 | 5/1984 | Janssen et al. | 350/582 |
| 4,538,851 | 9/1985 | Taylor | 296/180.1 |

FOREIGN PATENT DOCUMENTS

| | | | |
|---|---|---|---|
| 197808 | 8/1978 | Fed. Rep. of Germany | 350/584 |
| 0265047 | 11/1987 | Japan | 350/584 |

Primary Examiner—Eugene R. LaRoche
Assistant Examiner—R. D. Shafer

[57] ABSTRACT

A raindrop and dust free vision for outside rear view car mirror is made by a mirror frame with 5 modifications. (1) The upper edge of the mirror frame protruding out about 3 cm over the mirror surface. (2) A lengthened streamlined body (giving it a larger space behind the mirror glass to enclose a wind-guiding tunnel). (3) An upward angled, tapered, and bifurcated wind-guiding tunnel inside the streamlined body. (4) Two long and narrow openings at the ends of this tunnel. (5) A rectangular hole in the middle portion of the bottom or inferior border of the mirror frame wherein an U-shaped wind-guiding panel (either fixed or adjustable) contiguous with the above-mentioned wind-guiding tunnel. The first modification makes the upper edge of the mirror frame have the function similar to the eaves of a roof to prevent raindrops from building up too much and too easily on the mirror surface. The other four modifications are designed to concentrate and guide the air current to blow away the raindrops both on the mirror surface and on the adjacent side window when the car is running.

2 Claims, 3 Drawing Sheets

RAINDROP AND DUST FREE VISION FOR OUTSIDE REAR VIEW CAR MIRRORS

BACKGROUND OF THE INVENTION

On rainy days, raindrops often adhere to the mirror surface of the outside rear view mirrors and the adjacent side windows severely interfering with the driver's field of vision, especially when cars behind are using high beams in night time driving. Some vehicles nowdays eliminate raindrops on the outside rear view mirrors by heating or ventilation, but the results are not ideal. First, whenever the car stops, as often happens in downtown driving, raindrops immediately build up on the mirror surface requiring a long time to be eliminated by heating. Secondly, raindrops adhering on the outside of the adjacent side windows are not eliminated simultaneously. Thirdly, it is energy consuming. In the same way, dust is another problem interfering with the driver's field of vision when it adheres to the mirror surface. In order to remedy those problems, this invention improves upon the function of the mirrors currently in use. Its advantages include: (1) Eliminating quickly raindrops that adhere to the mirror surface when the car starts. (2) Simulataneously eliminating without energy consumpation the raindrops adhering on the adjacent areas of the side window. (3) Preventing dust from adhering to the mirror surface on non-rainy days.

SUMMARY OF THE INVENTION

It is a general object of the invention to obviate or minimize problems of the type previously mentioned producing clear view of vision for the outside rear view car mirrors.

It is a specific object of the invention to provide a modified mirror frame for eliminating raindrops and preventing dust from adhering to both the mirror surface of the outside rear view mirror and the adjacent side window.

Another object of the invention is to introduce an additional way of eliminating raindrops quickly from both the mirror surface of the outside rear view mirror and the adjacent side window by using air current when the car is moving.

It is yet a further object of the invention to provide a useful car part, which may be easily manufactured and is of practical use, and which can be mounted easily, conventionally, and optionally.

DESCRIPTION OF THE PREFERRED EMBODIMENT

Figure 1:
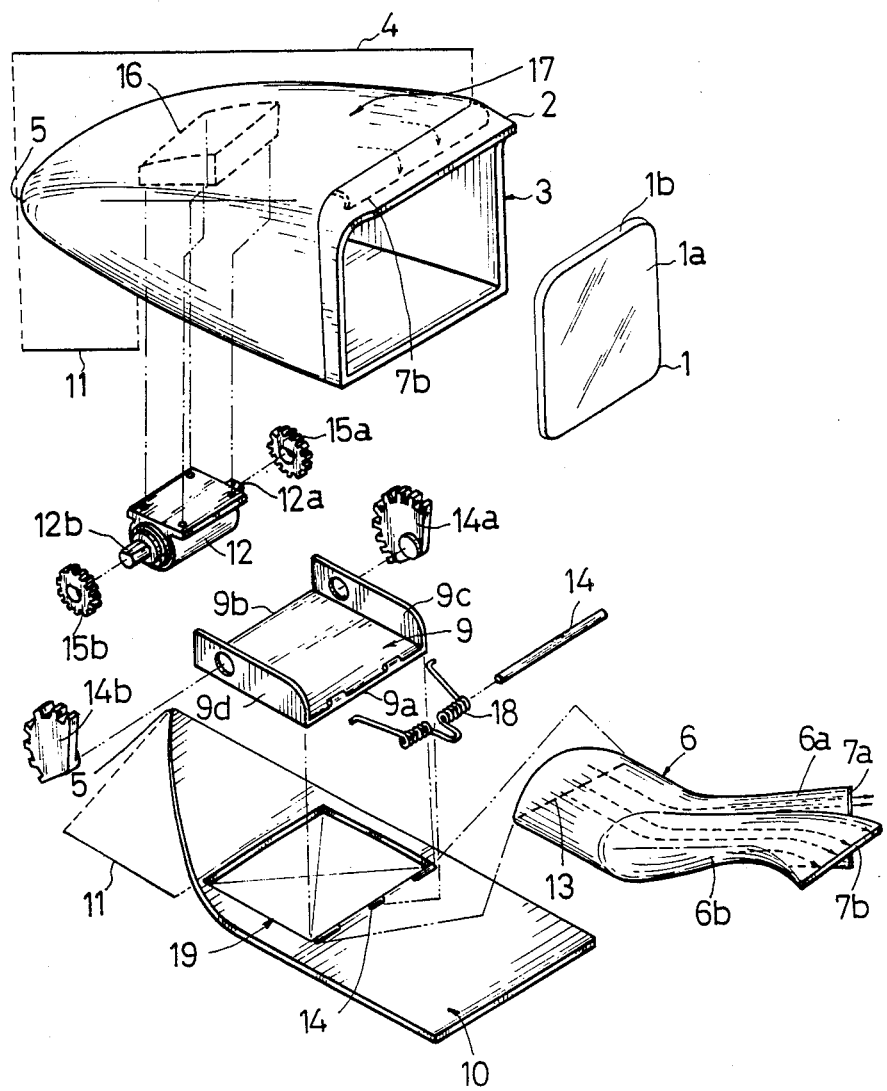
FIG. 1. Assembly drawing showing main parts and shape of the raindrop free outside rear view car mirror.
Figure 2:
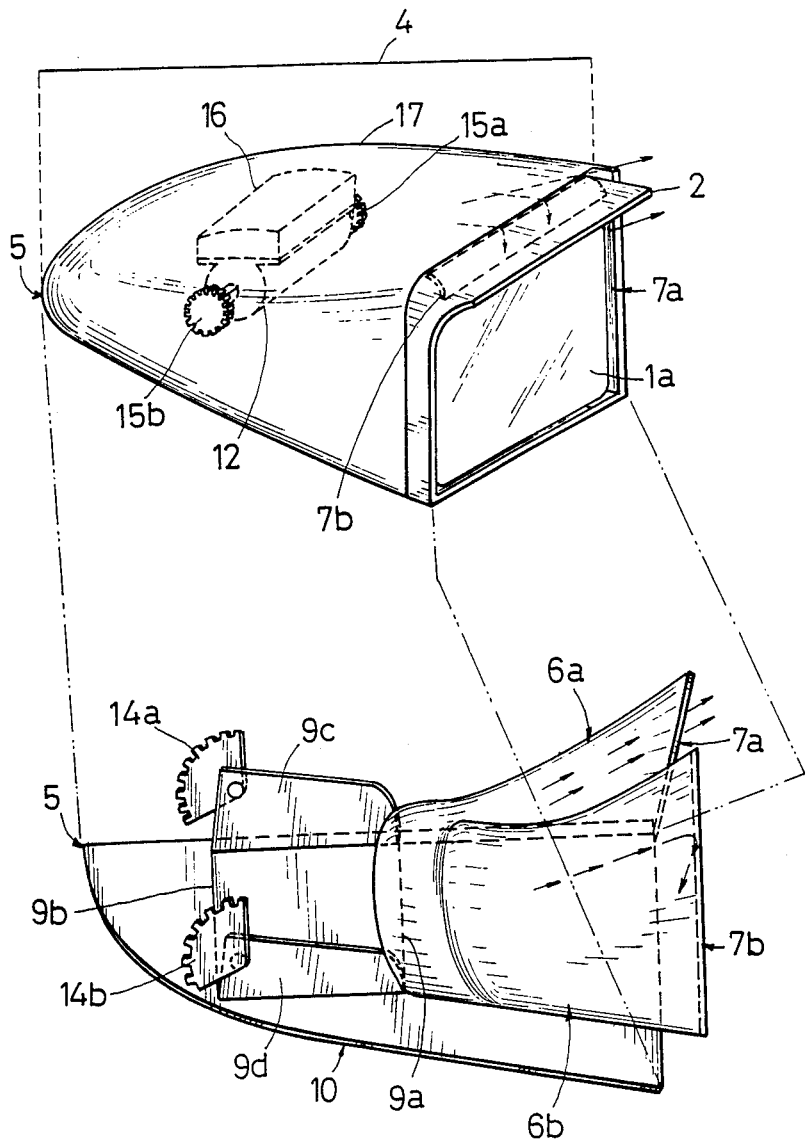
FIG. 2. Assembly drawing showing the cover and the bottom components of the raindrop free outside rear view car mirror after assembling their small parts.
Figure 3:
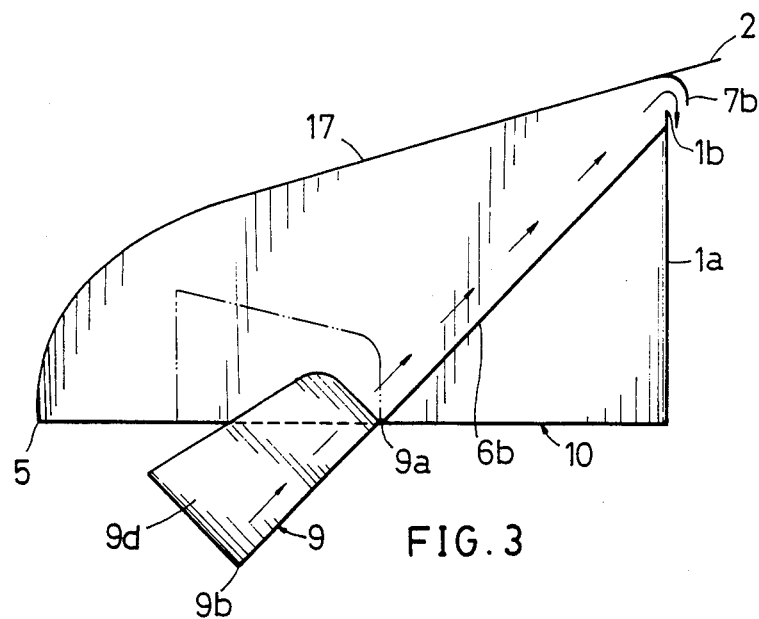
FIG. 3. Diagram of the raindrop free outside rear view car mirror seen from the lateral aspect showing its general configuration and the pathway of air current from the wind-guiding panel to the mirror surface.
Figure 4:
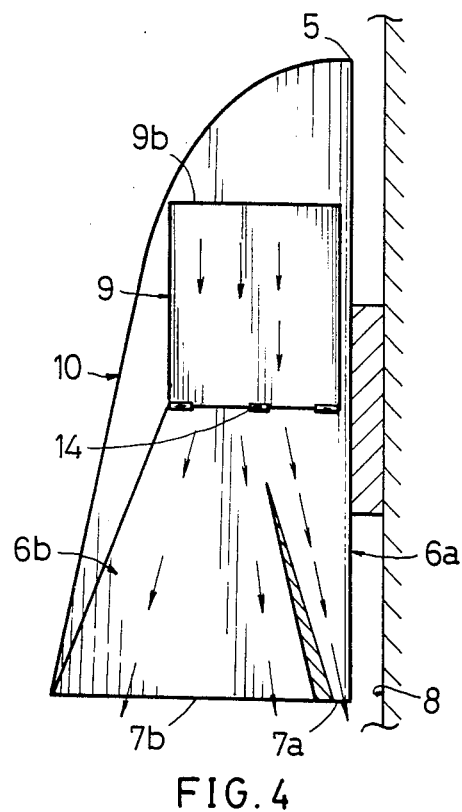
FIG. 4. Diagram of the raindrop free outside rear view car mirror seen from above after removing the cover showing the general configuration of the bottom, relationship with the side window and the pathways of air current from the wind-guiding panel to the mirror surface and the adjacent side window respectively.

Referring to drawings wherein like numerals indicate like parts. A mewly designed outside rear view car mirror has two ways of keeping the reflection clear on rainyl days. First, to prevent raindrops from building up too much and too easily on the mirror surface 1a, the upper edge 2 of the mirror frame 3 is lengthened so that it protrudes about 3 cm out over the upper edge 1b of the mirror glass 1 similar to the eaves of a roof. This effect is achieved without any interference of the driver's field of vision. Secondly, raindrops that build up on the mirror surface 1a and adjacent side window 8 when the car is stationary are dissipated quickly when the car starts by jets of air produced by a specially designed mirror frame that concentrates and guides the air current to blow away the raindrops both on the mirror surface 1a and on the adjacent side window 8. This continuous raindrop eliminating effect is achieved by four modifications of the mirror frame 3. (1) The body 4 of the mirror frame 3 behind the mirror glass 1 is lengthened and streamlined make its distal end tapered or cone-shaped 5 (so that it has a larger space to enclose a wind-guiding tunnel). (2) An upward angled, tapered, and bifurcated wind-guiding tunnel 6 located within the streamlined body 4 of the mirror frame 3. (3) Two long and narrow openings 7a, 7b at the ends of this tunnel 6, one located just above the upper edge 1b of the mirror glass 1 and just below the previously mentioned protruded upper edge 2 of the mirror frame 3 which curves downwards toward the mirror surface 1a and one located at the edge of the mirror glass 1 nearest the side window 8 which points slightly upward and inward toward the adjacent side window 8. (4) A rectangular hole 19 cut at the bottom or inferior border 10 of the mirror frame 3 wherein is replaced an U-shaped wind-guiding panel 9 (either fixed or adjustable) contiguous with the above-mentioned wind-guiding tunnel 6 (the rear portion 11 of the mirror frame 3 is serving as an overhang to keep raindrops from entering into the tunnel 6). IF adjustable, the panel 9 will lie flat against the inferior border or bottom 10 of the mirror frame 3 when not raining to reduce wind resistance and streamline its appearance. When it rains, a small DC motor 12 actuated by a pushbutton near the dashboard will angle the panel 9 downwards to begin the flow of air current from underneath the rear of the mirror into the wind-guiding tunnel 6 for blowing away the raindrops. If the panel 9 is fixed, the streamlining effect of retraction will be lost. On the other hand, the continuous passage or air current exiting the tunnel 6 will have the added benefit of keeping dust building up on the mirror surface 1a when it is not raining. The upward direction of the air flow together with the fact that the rear portion 11 of the mirror frame 3 is protecting the inlet 13 of the tunnel 6 will sufficiently prevent raindrops entering with the air current.

Because the two outlets or openings 7a, 7b at the ends of the wind-guiding tunnel 6 that channel the air current to the mirror surface 1a and the adjacent side window 8 are nearly vertically oriented to each other, the wind-guiding tunnel 6 must be divided or bifurcated into two parts 6a, 6b in its distal portion. When the car is running, raindrops build up on the side window 8 more than on the mirror surface 1a, so a relatively stronger air current is needed for the side window 8. For this purpose, more of the in-coming air flow must be directed to the side window 8 than to the mirror surface 1a. In addition the wind-guiding panel 9 is U-shaped rather than flat to prevent the air current from escaping from the sides thus maximizing the flow of air into the wind-guiding tunnel 6.

An adjustable wind-guiding panel 9 is attached at one end 9a to the middle portion of the inferior border or bottom 10 of the mirror frame 3 by a spring-loaded hinge 14 with the spring 18 attached to the under surface of above-mentioned wind-guiding panel for keeping the panel lying in a flat position against the bottom of the mirror frame 3 on non-rainy days. The other end 9b of this panel 9 will move downward when necessary to receive air current entering from the back of the mirror. Two large sector gears 14a, 14b associated at each end with limit switches for stopping the motor 12, one sector gear 14a or 14b for each side wall 9c or 9d of the U-shaped panel 9 secured to it on the outside upper edge and engaged with a small gear 15a, 15b secured to one of the ends of the shaft 12a, 12b of a small DC motor 12 secured to a supporting base 16 attached to the under surface of the upper border or cover 17 of the mirror frame 3. In such a way the wind-guiding panel 9 not only can be adjusted or controlled by a pushbutton actuated DC motor 12 but also is held firmly by the gears 14a, 14b, 15a & 15b against being moved by the thrust of air current.

I claim:

1. A raindrop and dust free vision outside rear view mirror attached to an automobile adjacent to the side window of said automobile, said mirror comprising:
   a mirror frame being composed of:
   a protruding upper edge about 3 cm out over the top edge of said mirror to prevent raindrops from building up too much on the surface of said mirror, and
   a streamlined body behind said mirror capable of enclosing a wind-guiding tunnel, and
   an upward angled, tapered, and bifurcated wind-guiding tunnel inside said streamlined body, and
   two long and narrow openings at the ends of said tunnel pointing toward the surface of said mirror and the adjacent side window respectively, and
   a rectangular hole in the middle portion of the bottom or inferior border of said mirror frame wherein an U-shaped wind-guiding panel (either fixed or adjustable) contiguous with said wind-guiding tunnel to concentrate and guide air currents through said wind-guiding tunnel to the surface of said mirror and the adjacent side window.

2. A raindrop and dust free vision outside rear view mirror as defined in claim 1 wherein:
   said adjustable U-shaped wind-guiding panel is attached at one end to the middle portion of the inferior border or bottom of said mirror frame by a spring-loaded hinge and comprising:
   a small DC motor secured to a supporting base attached to the under surface of the upper border or cover of said mirror frame having a motor shaft therein, and
   a small gear secured bilaterally to each end of said motor shaft, and two large sector gears associated at each of the ends with limit switches, each said sector gear secured to the outside upper edge of one of the side walls of said wind-guiding panel and engaged with said small gears, and a control circuit means including a pushbutton operatively depressed for rotating said motor, said gears, and angling said panel downwards to begin the flow of air current into said tunnel, and another pushbutton operatively depressed for reversely rotating said motor for flattening or streamlining said panel towards its flat position.

* * * * *